US009570756B2

(12) United States Patent
Haug et al.

(10) Patent No.: US 9,570,756 B2
(45) Date of Patent: Feb. 14, 2017

(54) FUEL CELL ELECTRODE WITH NANOSTRUCTURED CATALYST AND DISPERSED CATALYST SUBLAYER

(75) Inventors: Andrew T. Haug, St. Paul, MN (US); Susan M. Hendricks, Lake Elmo, MN (US); Andrew J. L. Steinbach, Minneapolis, MN (US); Gregory M. Haugen, Edina, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 350 days.

(21) Appl. No.: 12/976,168

(22) Filed: Dec. 22, 2010

(65) Prior Publication Data

US 2011/0151353 A1    Jun. 23, 2011

Related U.S. Application Data

(60) Provisional application No. 61/288,882, filed on Dec. 22, 2009.

(51) Int. Cl.
| | | |
|---|---|---|
| *H01M 4/86* | (2006.01) | |
| *H01M 4/88* | (2006.01) | |
| *H01M 4/92* | (2006.01) | |
| *H01M 8/10* | (2016.01) | |

(52) U.S. Cl.
CPC ........... *H01M 4/8657* (2013.01); *H01M 4/881* (2013.01); *H01M 4/8814* (2013.01); *H01M 4/8828* (2013.01); *H01M 4/8871* (2013.01); *H01M 4/921* (2013.01); *H01M 2008/1095* (2013.01); *Y02E 60/50* (2013.01)

(58) Field of Classification Search
CPC ... H01M 4/861; H01M 4/8636; H01M 4/8657
See application file for complete search history.

(56) References Cited

U.S. PATENT DOCUMENTS

| | | | |
|---|---|---|---|
| 4,340,276 A | 7/1982 | Maffitt et al. | |
| 4,568,598 A | 2/1986 | Bilkadi et al. | |
| 4,812,352 A | 3/1989 | Debe | |
| 5,039,561 A | 8/1991 | Debe | |
| 5,176,786 A | 1/1993 | Debe | |
| 5,336,558 A | 8/1994 | Debe | |
| 5,338,430 A | 8/1994 | Parsonage et al. | |
| 5,879,827 A * | 3/1999 | Debe ...................... | B01J 23/42 204/279 |
| 5,879,828 A | 3/1999 | Debe et al. | |
| 6,040,077 A | 3/2000 | Debe et al. | |
| 6,238,534 B1 * | 5/2001 | Mao et al. ..................... | 204/416 |
| 6,287,717 B1 | 9/2001 | Cavalca et al. | |
| 6,319,293 B1 | 11/2001 | Debe et al. | |
| 6,482,763 B2 | 11/2002 | Haugen et al. | |
| 6,624,328 B1 | 9/2003 | Guerra | |
| 6,946,362 B2 | 9/2005 | Gore et al. | |
| 7,141,270 B2 * | 11/2006 | Wittpahl et al. ............. | 427/115 |
| 7,348,088 B2 | 3/2008 | Hamrock et al. | |
| 7,419,741 B2 | 9/2008 | Vernstrom et al. | |
| 7,572,534 B2 | 8/2009 | Frey et al. | |
| 7,601,454 B2 | 10/2009 | Takahashi et al. | |
| 7,977,007 B2 | 7/2011 | Niu | |
| 2002/0004453 A1 | 1/2002 | Haugen et al. | |
| 2003/0072991 A1 * | 4/2003 | Matsubara .......... | H01M 4/8605 429/523 |
| 2004/0116742 A1 | 6/2004 | Guerra | |
| 2005/0238948 A1 * | 10/2005 | Mei et al. ........................ | 429/40 |
| 2005/0250002 A1 * | 11/2005 | Stanley ................. | H01M 4/861 429/483 |
| 2006/0063054 A1 | 3/2006 | Frey et al. | |
| 2006/0292434 A1 * | 12/2006 | Hampden-Smith et al. ... | 429/40 |
| 2007/0082256 A1 * | 4/2007 | Debe et al. ...................... | 429/44 |
| 2007/0082814 A1 | 4/2007 | Debe et al. | |
| 2007/0134545 A1 | 6/2007 | Deng et al. | |
| 2007/0269699 A1 | 11/2007 | Pak | |
| 2008/0020923 A1 | 1/2008 | Debe et al. | |
| 2010/0297342 A1 | 11/2010 | Yamada et al. | |
| 2010/0304240 A1 | 12/2010 | Koike et al. | |

FOREIGN PATENT DOCUMENTS

| | | |
|---|---|---|
| CN | 1983685 | 6/2007 |
| JP | 2007-165306 | 6/2007 |
| JP | 2007-273278 | 10/2007 |
| KR | 2006-001455 | 1/2006 |
| WO | WO 03/088388 A1 | 10/2003 |
| WO | WO 2008/153113 A1 | 12/2008 |
| WO | WO 2009/068958 A1 | 6/2009 |
| WO | WO 2009/082666 A1 | 7/2009 |

OTHER PUBLICATIONS

G. M. Chow et al.; "Fabrication of Biologically Based Microstructure Composites for Vacuum Field Emission", Materials Science and Engineering, A158, 1992, pp. 1-6.
M. K. Debe, K. K. Kam, J. C. Liu, and R. J. Poirier; "Vacuum Vapor Deposited Thin Films of a Perylene Dicarboximide Derivative: Microstructure Versus Deposition Parameters", J. Vac. Sci. Technol. A, 6 (3), May/Jun. 1988, pp. 1907-1911.
M. K. Debe and R. J. Poirier; "Effect of Gravity On Copper Phthalocyanine Thin Films,III: Microstructure Comparisons of Copper Phthalocyanine Thin Films Grown in Microgravity and Unit Gravity", Thin Solid Films, vol. 186, 1990, pp. 327-347.
K. K. Kam, M. K. Debe, R. J. Poirier, and A. R. Drube; "Summary Abstract: Dramatic Variation of the Physical Microstructure of a Vapor Deposited Organic Thin Film", J. Vac. Sci. Technol, A, 5(4), Jul./Aug. 1987, pp. 1914-1916.
P. K. Lee and M. K. Debe, "Measurement and Modeling of the Reflectance-Reducing Properties of Gradient Index Microstructured Surfaces", Photographic Science and Engineering, vol. 24, (4), Jul./Aug. 1980, pp. 211-216.
S. Ohnuma, Y. Nakanouchi, and T. Masumoto: "Amorphous Ultrafine Metallic Particles Prepared by Sputtering Method", Rapidly Quenched Metals, Proc. of the Fifth Int. Conf. on Rapidly Quenched Metals, Wurzburg, Germany, Sep. 3-7, 1984, S. Steeb et al., eds., Elsevier Science Publisher B.V., New York 1985, pp. 1117-1124.

(Continued)

*Primary Examiner* — Maria J Laios
(74) *Attorney, Agent, or Firm* — Gregory D. Allen

(57) ABSTRACT

Polymer electrolyte membrane (PEM) fuel cell membrane electrode assemblies (MEA's) are provided which have nanostructured thin film (NSTF) catalyst electrodes and additionally a sublayer of dispersed catalyst situated between the NSTF catalyst and the PEM of the MEA.

5 Claims, 2 Drawing Sheets

(56) References Cited

OTHER PUBLICATIONS

Y. Sadaoka, T. A. Jones, G. S. Revell, W. Gopel; Effects Of Morphology on $NO_2$ Detection in Air at Room Temperature With Phthalocyanine Thin Films, Journal of Materials Science, vol. 25, 1990, pp. 5257-5268.
H. Tang, J. H. Chen, Z. P. Huang, D. Z. Wang, Z. F. Ren, L. H. Nie, Y. F. Kuang, and S. Z. Yao; "High Dispersion and Electrocatalytic Properties of Platinum on Well-Aligned Carbon Nanotube Arrays", Carbon, vol. 42, 2004, pp. 191-197.
International Search Report, Form PCT/ISA/210, International Application No. PCT/US2010/061798, International Filing Date—Dec. 22, 2010, 4 pages.

\* cited by examiner

FUEL CELL ELECTRODE WITH NANOSTRUCTURED CATALYST AND DISPERSED CATALYST SUBLAYER

CROSS REFERENCE TO RELATED APPLICATION

This application claims the benefit of U.S. Provisional Patent Application No. 61/288,882, filed Dec. 22, 2009, the disclosure of which is incorporated by reference herein in its entirety.

This invention was made with Government support under Cooperative Agreement DE-FG36-07GO17007 awarded by DOE. The Government has certain rights in this invention.

FIELD OF THE DISCLOSURE

This disclosure relates to polymer electrolyte membrane (PEM) fuel cell membrane electrode assemblies (MEA's) having nanostructured thin film (NSTF) catalyst electrodes, and additionally having a sublayer of dispersed catalyst between the NSTF catalyst and the PEM of the MEA.

BACKGROUND OF THE DISCLOSURE

U.S. Pat. No. 6,238,534, the disclosure of which is incorporated herein by reference, discloses certain hybrid membrane electrode assemblies.

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. No. 6,482,763, the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured thin film catalysts.

U.S. Pat. Nos. 4,812,352, 5,039,561, 5,176,786, and 5,336,558, the disclosures of which are incorporated herein by reference, concern microstructures.

U.S. Pat. No. 7,419,741, the disclosure of which is incorporated herein by reference, discloses fuel cell cathode catalysts comprising nanostructures formed by depositing alternating layers of platinum and a second layer onto a microstructure support, which may form a ternary catalyst.

U.S. patent application Ser. No. 11/248,561, the disclosure of which is incorporated herein by reference, discloses fuel cell cathode catalysts comprising microstructured support whiskers bearing nanoscopic catalyst particles comprising platinum and manganese and at least one other metal at specified volume ratios and Mn content, where other metal is typically Ni or Co.

U.S. patent application Ser. Nos. 10/945,178 and 10/944,998, the disclosures of which are incorporated herein by reference, discloses fuel cell membrane electrode assemblies and fuel cell polymer electrolyte membranes comprising bound anionic functional groups and Mn or Ru cations or comprising manganese oxides which demonstrate increased durability.

SUMMARY

The present disclosure provides a PEM fuel cell electrode that offers improved performance at low temperature operation. The electrode consists of a dispersed catalyst electrode layer (sub-layer) adjacent to the membrane and a nanostructured thin film (NSTF) electrode layer. Performance benefits are especially evident under conditions of high voltage operation. The sublayer may be used in the cathode alone, in the anode alone, or in both electrodes.

In one respect, the present disclosure provides a fuel cell membrane electrode assembly comprising: a) a polymer electrolyte membrane having a cathode side and an anode side; b) a sublayer comprising a first catalyst material adjoining at least one side of the polymer electrolyte membrane; and c) a nanostructured thin film catalyst layer comprising a second catalyst material adjoining the sublayer. In some embodiments, the sublayer adjoins the cathode side of the polymer electrolyte membrane and the nanostructured thin film catalyst layer adjoining the sublayer is a cathode catalyst layer. In some embodiments, the sublayer adjoins the anode side of the polymer electrolyte membrane and the nanotructured thin film catalyst layer adjoining the sublayer is an anode catalyst layer. In some embodiments, the average density of the first catalyst material in the sublayer is less than 1.0 $mg/mm^3$ and the average density of the second catalyst material in the nanostructured thin film catalyst layer is greater than 1.0 $mg/mm^3$. In some embodiments, the electrochemical surface area/volume ratio of the first catalyst material in the sublayer is less than 200 $cm^2/mm^3$ and the electrochemical surface area/volume ratio of the second catalyst material in the nanostructured thin film catalyst layer is greater than 200 $cm^2/mm^3$. In some embodiments, the first catalyst material in the sublayer is borne on support particles having an average aspect ratio of less than 3 and the second catalyst material in the nanostructured thin film catalyst layer is borne on support particles having an average aspect ratio of greater than 3.

In this application:

"equivalent weight" (EW) of a polymer means the weight in grams of polymer which will neutralize one equivalent of base;

"highly fluorinated" means containing fluorine in an amount of 40 wt % or more, typically 50 wt % or more and more typically 60 wt % or more;

"electrochemical surface area" means the surface area available for participation in an electrochemical reaction as determined by $H_2$ adsorption/desorption;

"microtextures" means surface structures, features or convolutions made by any process, including impression, molding or etching, whose average depth is between 1 and 100 micrometers;

"nanostructured element" means an acicular, discrete, microscopic structure comprising a catalytic material on at least a portion of its surface;

"microstructure" means an acicular, discrete, microscopic structure;

"nanoscopic catalyst particle" means a particle of catalyst material having at least one dimension of about 10 nm or less or having a crystallite size of about 10 nm or less, measured as diffraction peak half widths in standard 2-theta x-ray diffraction scans;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

DETAILED DESCRIPTION

Figure 1:
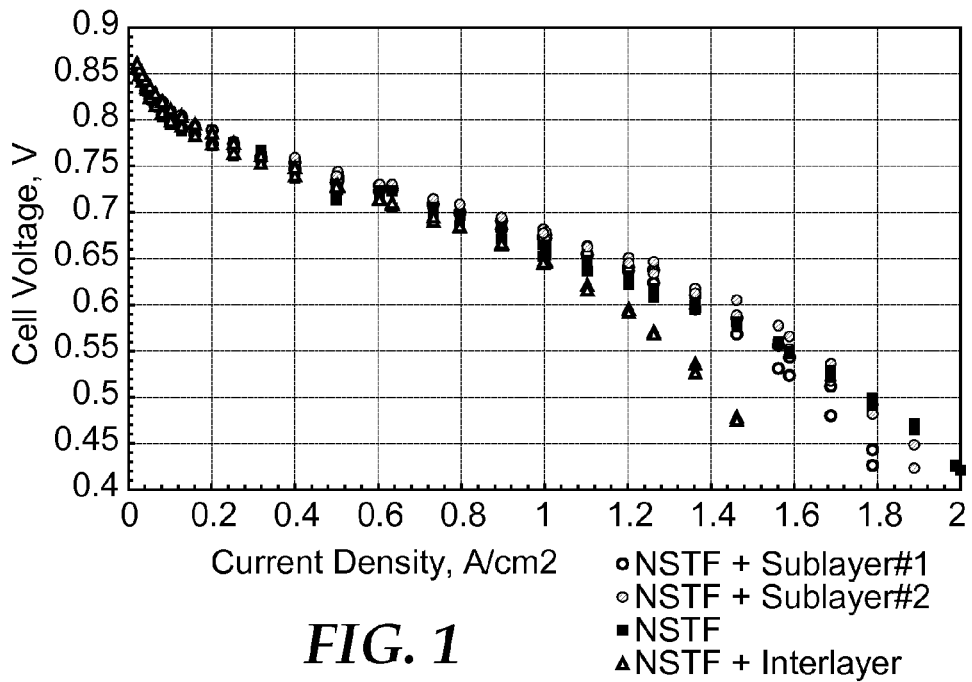
FIGS. 1-4 are graphs representing fuel cell test results for two MEA's according to the present disclosure ("NSTF+Sublayer") and two comparative MEA's ("NSTF" and "NSTF+interlayer"), as described in the Examples below.

The present disclosure provides a PEM fuel cell electrode including a nano-structured thin film (NSTF) layer and a dispersed catalyst sublayer between the NSTF layer and the membrane.

The membrane electrode assembly (MEA) according to the present disclosure may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)) which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

PEM's useful in the MEA's according to the present disclosure may comprise any suitable polymer electrolyte. The polymer electrolytes useful in the present disclosure typically bear anionic functional groups bound to a common backbone, which are typically sulfonic acid groups but may also include carboxylic acid groups, imide groups, amide groups, or other acidic functional groups. The polymer electrolytes useful in the present disclosure are typically highly fluorinated and most typically perfluorinated, but may also be partially fluorinated or non-fluorinated. The polymer electrolytes useful in the present disclosure are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—$O$—$CF$=$CF_2$, described in U.S. patent application Ser. Nos. 10/322,254, 10/322,226 and 10/325,278, which are incorporated herein by reference. The polymer typically has an equivalent weight (EW) of 1200 or less, more typically 1100 or less, more typically 1050 or less, more typically 1000 or less, and in some embodiments 950 or less, 900 or less, 850 or less, or 800 or less. In addition to fluorinated membranes, membranes useful in the present disclosure may include hydrocarbon polymers, including aromatic polymers. Examples of useful hydrocarbon polymers may include sulfonated polyetheretherketones, sulfonated polysulfones and sulfonated polystyrenes.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns.

In one embodiment of the present disclosure, a salt or oxide of manganese or cerium, more typically a salt, more typically manganese, is added to the acid form polymer electrolyte prior to membrane formation. Typically the salt is mixed well with or dissolved within the polymer electrolyte to achieve substantially uniform distribution. The salt may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, including $Mn^{2+}$, $Mn^{3+}$ and $Mn^{4+}$, but are most typically $Mn^{2+}$. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

Any suitable dispersed catalyst may be used in the sublayer of the present disclosure. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM in the form of a catalyst ink. Alternately, the catalyst ink may be applied to a transfer substrate, dried, and thereafter applied to the PEM as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. In some embodiments of the present disclosure, a salt or oxide of manganese or cerium, more typically an oxide, more typically of cerium, is added to the polymer electrolyte prior to membrane formation. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

To make an MEA or CCM, cathode and anode catalyst layer may be applied to the PEM by any suitable means. In some embodiments, the present disclosure provides a CCM or MEA comprising certain catalysts comprising nanostructured elements comprising microstructured support whiskers bearing discrete or fused nanoscopic catalyst particles, i.e., a nanostructured thin film catalyst (NSTF). U.S. Pat. Nos. 4,812,352, 5,039,561, 5,176,786, and 5,336,558, the disclosures of which are incorporated herein by reference, concern microstructures which may be used in the practice of the present disclosure. U.S. Pat. Nos. 5,338,430, 5,879,827, 6,040,077 and 6,319,293 and U.S. Pat. No. 6,482,763, the disclosures of which are incorporated herein by reference, describe nanostructured elements comprising microstructured support whiskers bearing nanoscopic catalyst particles. U.S. Pat. No. 5,879,827 and U.S. Pat. No. 6,482,763, the disclosures of which are incorporated herein by reference, describe nanoscopic catalyst particles comprising alternating layers.

In some embodiments, the nanoscopic catalyst particles may be made by the alternating application of multiple layers of catalyst material. In some embodiments, nanoscopic catalyst particles according to the present disclosure may be made by the alternating application of first and second layers, the first layer comprising or consisting essentially of platinum and the second layer being an alloy or intimate mixture of manganese and a second transition metal selected from the group consisting of Group VIb metals, Group VIIb metals and Group VIIIb metals other than platinum and manganese. Alternately, three layers may be applied, the first layer comprising or consisting essentially of platinum, the second layer comprising or consisting essentially of manganese, and the third comprising or consisting essentially of a second transition metal selected from the group consisting of Group VIb metals, Group VIIb metals and Group VIIIb metals other than platinum and manganese. Typically the second transition metal is selected from the group consisting of nickel and cobalt. It is contemplated that alternating application of first and second layers does not exclude the application of layers in addition to the first and second layers. Typically, the volume ratio of manganese to the other transition metal is between 10:90 and 90:10. In some embodiments, the volume ratio of manganese to the other transition metal is between 40:60 and 60:40. The average bilayer planar equivalent thickness of the first and second layers is typically less than 100 Å. The average bilayer planar equivalent thickness is typically greater than 3 Å and more typically greater than 8 Å.

NSTF catalyst may be made by any suitable method. Typically, the NSTF catalyst is made by alternate steps of vacuum deposition of a layer comprising or consisting essentially of platinum and a second layer, or a second and a third layer, on a film of microstructures. Typically, sputter deposition is used.

Any suitable microstructures may be used, including organic or inorganic microstructures. Typical microstructures are described in U.S. Pat. Nos. 4,812,352, 5,039,561, 5,176,786, 5,336,558, 5,338,430, 5,879,827, 6,040,077 and 6,319,293, and U.S. Pat. No. 6,482,763, the disclosures of which are incorporated herein by reference. Typical microstructures are made by thermal sublimation and vacuum annealing of the organic pigment C.I. Pigment Red 149, i.e., N,N'-di(3,5-xylyl)perylene-3,4:9,10-bis(dicarboximide).

Methods for making organic nanostructured layers are disclosed in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. Nos. 4,568,598, 4,340,276, the disclosures of the patents are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon 42 (2004) 191-197. Properties of catalyst layers using grassy or bristled silicon are disclosed in U.S. Pat. No. 6,946,362.

Typically, the microstructure material excludes electrically conductive materials and more typically excludes electrically conductive carbon. Most typically, the microstructure material excludes carbon black.

In an alternate embodiment, a multicomponent NSTF catalyst may be deposited from fewer targets than the total number of components, where at least one target is composed of at least two components. In an alternate embodiment, a multicomponent NSTF catalyst such as a ternary catalyst may be deposited from a single target, as disclosed in U.S. Patent Publication No. 2007/0082814 A1, the disclosure of which is incorporated herein by reference.

Vacuum deposition may be carried out in any suitable apparatus, such as described in U.S. Pat. Nos. 5,338,430, 5,879,827, 5,879,828, 6,040,077 and 6,319,293 and U.S. Patent Application Publication No. 2002/0004453 A1, the disclosures of which are incorporated herein by reference. One such apparatus is depicted schematically in FIG. 4A of U.S. Pat. Nos. 5,879,827 and 6,040,077, and discussed in the accompanying text, wherein the substrate is mounted on a drum which is then rotated under multiple DC magnetron sputtering sources in sequence. The resulting structure may be layered, or substantially layered, or may include more complex intermixed structures, depending on the thickness of the material deposited and the surface area of the substrate on which the material is deposited.

The catalysts of the present disclosure can be used to manufacture membrane electrode assemblies (MEA's) incorporated in fuel cells such as are described in U.S. Pat. Nos. 5,879,827 and 5,879,828, the teachings of which are incorporated herein by reference.

In some embodiments, the average density of the catalyst material in the NSTF layer is greater than 1.0 mg/mm$^3$ and in some embodiments greater than 2.0 mg/mm$^3$. In some embodiments, the average density of the catalyst material in the sublayer is less than 1.0 mg/mm$^3$ and in some embodiments layer is less than 0.5 mg/mm$^3$.

In some embodiments, the electrochemical surface area/volume ratio of the catalyst material in the NSTF layer is greater than 200 cm$^2$/mm$^3$, and in some embodiments greater than 300 mm$^2$/mm$^3$. In some embodiments, the electrochemical surface area/volume ratio of the catalyst material in the sublayer is less than 200 cm$^2$/mm$^3$, and in some embodiments less than 150 cm$^2$/mm$^3$.

In some embodiments, the catalyst material in the NSTF layer is borne on support particles having an average aspect ratio of greater than 3 and the catalyst material in the sublayer is borne on support particles having an average aspect ratio of less than 3.

To make an MEA, GDL's may be applied to either side of a CCM by any suitable means. Any suitable GDL may be used in the practice of the present disclosure. Typically the GDL is comprised of sheet material comprising carbon fibers. Typically the GDL is a carbon fiber construction selected from woven and non-woven carbon fiber constructions. Carbon fiber constructions which may be useful in the practice of the present disclosure may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In some embodiments, the MEA according to the present disclosure, which includes a cathode-side sublayer, additionally comprises one or more of: an anode-side sublayer, a cathode-side interlayer or an anode-side interlayer. In one alternate embodiment of the present disclosure the sublayer is on the anode side and not on the cathode side.

As used herein, an interlayer is located between the GDL and NSTF.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Two MEA's according to the present disclosure and two comparative MEA's were made and tested as described below. The four MEA's were as follows:

A) Two "NSTF+sublayer" MEA's were made, which have the following layers, in order: cathode-side GDL, cathode-side NSTF catalyst, cathode-side dispersed catalyst sublayer, PEM, anode-side NSTF catalyst, anode-side GDL.

B) One comparative "NSTF" MEA was made, which had the following layers, in order: cathode-side GDL, cathode-side NSTF catalyst, PEM, anode-side NSTF catalyst, anode-side GDL.

C) One comparative "NSTF+interlayer" MEA was made, which had the following layers, in order: cathode-side GDL, cathode-side dispersed catalyst interlayer, cathode-side NSTF catalyst, PEM, anode-side NSTF catalyst, anode-side GDL.

Manufacture

The NSTF+sublayer MEA's were made as follows.

In all cases, the ionomer used was a copolymer of tetrafluoroethylene (TFE) and $FSO_2-CF_2CF_2CF_2CF_2-O-CF=CF_2$, described in U.S. patent application Ser. Nos. 10/322,254, 10/322,226 and 10/325,278, which are incorporated herein by reference.

Ink Preparation

TKK 10V30E-HT catalyst, 1200EW ionomer, water and isopropanol were mixed to form an ink. Ionomer to Carbon ratio was 1.2 by weight. This high ionomer content allows ionomer volume in the sublayer for attachment of NSTF catalyst. Percent solids by weight was 6%, so that low sublayer electrode catalyst loadings (0.015 mg Pt per $cm^2$ area) could be readily applied by spraying the ink. Media (5 mm ceramic balls) was added to the ink. 25 grams was added for a 50 mL bottle. The bottle was then de-aerated (purged with nitrogen) and rolled at 90 rpm for 24 hours to ensure good mixing of ink components. This ink was used for sublayer and interlayers.

Ink Application to for Sub-Layer

The following were used in this process: a glass plate, VWR 370H hot plate, Paasche airbrush set, a plastic frame with an 8×8 cm open square center, 0.8 mil thick PEM of 800EW ionomer attached to liner, and sublayer ink. The glass plate was placed on the hot plate and the hot plate set to 70° C. The Paasche sprayer was attached to a pressurized air vent and the sublayer catalyst ink was placed in the sprayer cartridge. The membrane+liner was weighed. The membrane was placed, liner side down, on top of the glass plate. The frame was placed above the membrane with the membrane showing through the frame's open center. The air vent was turned on. Spraying was accomplished by holding the sprayer 8 inches above the target (membrane). Begin spraying ink on the liner while moving left and right across the membrane. Slowly move downward after each left-right pass. A thin, uniform coating was applied in a raster motion. The membrane+liner was weighed between each coating and spraying continued until the goal weight was reached.

CCM Manufacture of NSTF+Sublayer

A CCM typically consists of anode and cathode catalyst electrodes separated by a proton exchange membrane. The NSTF+sublayer CCM contains two NSTF electrodes (anode and cathode), a dispersed catalyst electrode sublayer and a proton exchange membrane. The method of making the CCM is to start with: a) NSTF anode electrode coated on liner, b) NSTF cathode electrode coated on liner, and c) dispersed sublayer (SL) electrode coated on membrane+liner. First the membrane+SL was removed from the liner. Then the NSTF cathode+liner was placed against the membrane+SL, with the NSTF catalyst adjacent to the dispersed SL and the NSTF anode+liner was placed against the membrane+SL, with the NSTF catalyst adjacent to the uncoated side of the membrane. The assembly was placed between two Teflon sheets and run through a Hiroko laminator at 350 F and allowed to cool. Teflon sheets were removed and the anode and cathode NSTF liners were pealed away, leaving the NSTF electrodes bonded to the membrane+SL. The NSTL cathode catalysts were 90/6/6 PtCoMn trinary catalysts at a loading of 0.1 mg Pt/$cm^2$. The NSTL anode catalysts were 90/6/6 PtCoMn trinary catalysts at a loading of 0.05 mg Pt/$cm^2$.

MEA Manufacture and Cell Build

This NSTF+SL CCM was then assembled in a fuel cell test fixture using two 50 $cm^2$ non-plasma treated gas diffusion layers (GDL's), Teflon gaskets measuring 90% of the thickness of these GDL's, and the NSTF+SL CCM.

MEA's were conditioned by short time operation at a cell voltage of 1.4 to 1.5V for 10 minutes at 70° C. cell temperature, 100% anode and cathode inlet humidification, while flowing hydrogen gas through the anode and nitrogen gas through the cathode.

Comparative MEA's

The NSTF MEA was made substantially as described above, except that the sublayer steps were excluded. The NSTF+interlayer MEA was made by addition of an interlayer to an NSTF MEA, substantially following the method described above for addition of a sublayer to a PEM.

Testing and Results

All four fuel cells were tested in fuel cell test stands after conditioning.

FIG. 1 shows the performance of NSTF, NSTF+interlayer and NSTF+sublayer MEA's under optimal operating conditions. Data was taken at: 80° C. cell temperature, 68° C. anode and cathode inlet dewpoints, 2/2.5 anode and cathode stoichiometric flow rates, 7.35/7.35 psig anode and cathode backpressures, and 120 seconds per data point. The NSTF+ sublayer MEA's show improved performance over both the NSTF baseline and the NSTF+interlayer out to 1.6 A/cm$^2$. At 1 A/cm$^2$, this improvement is 15 and 30 mV over the baseline and interlayer respectively.

Figure 2:
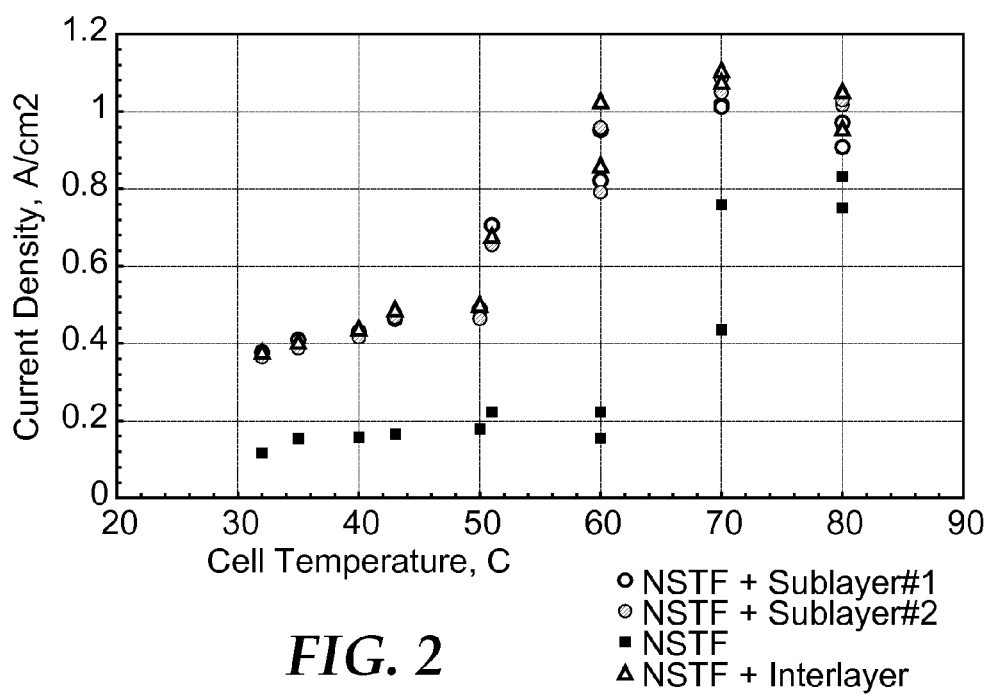

FIG. 2 shows the steady state performance of NSTF, NSTF+interlayer and NSTF+sublayer MEA's at various temperatures and supersaturated inlet gases. Data was taken at: 60° C. cell temperature, 140% relative humidity of the inlet gases, 696/1657 SCCM constant anode and cathode flowrates, 7.35/7.35 psig anode and cathode backpressures, and 5 minutes per data point. Both the NSTF+interlayer and NSTF+sublayer show significant performance improvement vs. the NSTF baseline at most temperatures.

Figure 3:
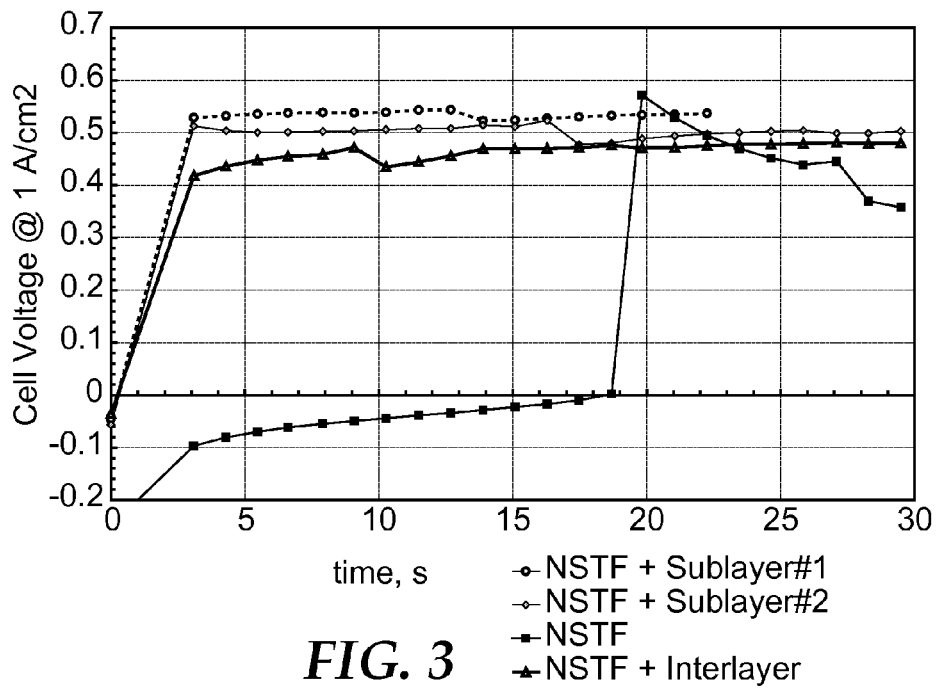
Figure 4:
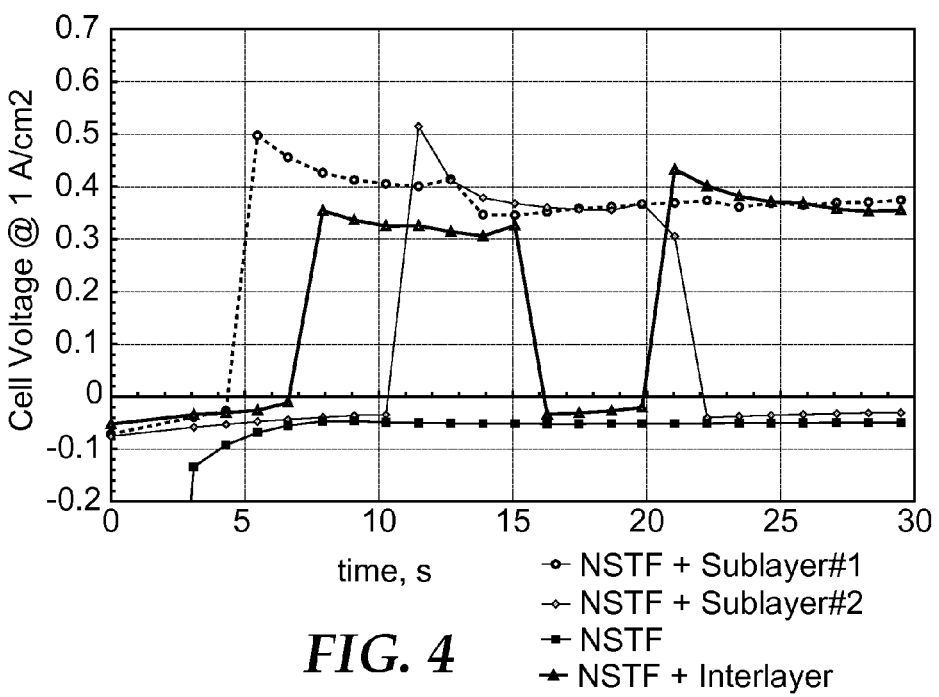

FIG. 3 and FIG. 4 show the performance of NSTF, NSTF+interlayer and NSTF+sublayer MEA's as just after transition from 0.02 A/cm$^2$ to 1.0 A/cm$^2$ at 60° C., 140% RH and 50° C., 140% RH respectively. Data was taken at: 60° C. cell temperature, 140% relative humidity of the inlet gases, 696/1657 SCCM constant anode and cathode flowrates, 7.35/7.35 psig anode and cathode backpressures, and 5 minutes per data point. At 60° C., the NSTF+sublayer cells show similar recovery times and improved recovery performance vs. the interlayer MEA. Both the interlayer and sublayer show improved performance over the baseline NSTF MEA. At 50° C., the baseline NSTF is unable to generate 1 A/cm$^2$ of power at 50° C. The sublayer MEA's show similar recovery times and improved recovery performance vs. the interlayer MEA.

In summary, MEA's including the sublayer improved upon the comparative MEA's by offering improved peak performance while providing transient and low temperature (30-50° C.) performance comparable to the NSTF+interlayer MEA.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A fuel cell membrane electrode assembly comprising:
a) a polymer electrolyte membrane having a cathode side and an anode side;
b) a sublayer having first and second sides, and comprising catalyst material, the first side of the sublayer adjoining one of the anode side or the cathode side of the polymer electrolyte membrane; and
c) a nanostructured thin film catalyst layer consisting of microstructured support whiskers bearing discrete or fused nanoscopic catalyst particles, the nanostructured thin film catalyst layer adjoining the second side of the sublayer,
wherein the catalyst material in the sublayer is borne on support particles having an average aspect ratio of less than 3,
wherein the nanoscopic catalyst particles in the nanostructured thin film catalyst layer are borne on whiskers having an average aspect ratio of greater than 3,
wherein the whiskers are microstructured support whiskers that are not electrically conductive,
wherein the average density of the catalyst material in the sublayer is less than 1.0 mg/mm$^3$, wherein the nanostructured thin film catalyst layer comprises catalyst material and wherein the average density of the catalyst material in the nanostructured thin film catalyst layer is greater than 1.0 mg/m$^3$.

2. The fuel cell membrane electrode assembly according to claim 1 wherein the sublayer adjoins the cathode side of the polymer electrolyte membrane and the nanostructured thin film catalyst layer adjoining the sublayer is a cathode catalyst layer.

3. The fuel cell membrane electrode assembly according to claim 1 wherein the sublayer adjoins the anode side of the polymer electrolyte membrane and the nanostructured thin film catalyst layer adjoining the sublayer is an anode catalyst layer.

4. The fuel cell membrane electrode assembly according to claim 1 wherein the average density of the catalyst material in the sublayer is less than 1.0 mg/mm$^3$, wherein the nanostructured thin film catalyst layer comprises catalyst material and wherein the average density of the catalyst material in the nanostructured thin film catalyst layer is greater than 1.0 mg/mm$^3$.

5. The fuel cell membrane electrode assembly according to claim 1 having an electrochemical surface area/volume ratio of the catalyst material in the sublayer less than 200 cm$^2$/mm$^3$, wherein the nanostructured thin film catalyst layer comprises catalyst material and wherein an electrochemical surface area/volume ratio of the catalyst material in the nanostructured thin film catalyst layer is greater than 200 cm$^2$/mm$^3$.

* * * * *

UNITED STATES PATENT AND TRADEMARK OFFICE
CERTIFICATE OF CORRECTION

PATENT NO. : 9,570,756 B2  
APPLICATION NO. : 12/976168  
DATED : February 14, 2017  
INVENTOR(S) : Andrew Haug et al.

Page 1 of 1

It is certified that error appears in the above-identified patent and that said Letters Patent is hereby corrected as shown below:

In the Specification

<u>Column 2</u>

Line 12, delete "nanotructured" and insert -- nanostructured --, therefor.

Line 15, delete "nanotructured" and insert -- nanostructured --, therefor.

Line 19, delete "nanotructured" and insert -- nanostructured --, therefor.

Line 23, delete "nanotructured" and insert -- nanostructured --, therefor.

Line 28, delete "nanotructured" and insert -- nanostructured --, therefor.

Line 32, delete "nanotructured" and insert -- nanostructured --, therefor.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*